United States Patent Office 3,486,263
Patented Dec. 30, 1969

3,486,263
MOUNTING FRAME
Sven A. Larsson, Frejavagen 3, Sundbyberg 4, Sweden
Filed Aug. 11, 1967, Ser. No. 660,040
Claims priority, application Sweden, Sept. 9, 1966,
12,141/66
Int. Cl. G09f 1/12
U.S. Cl. 40—152                                    2 Claims

ABSTRACT OF THE DISCLOSURE

A rectangular mounting frame for transparencies, consisting of two mounting frame halves, which are arranged to be joined together after positioning a transparency therebetween, characterized in that one side edge of at least one of the frame halves is provided with a flange perpendicular to the surface plane of the frame half. The flange, when the two frame halves are joined into a complete frame, extends over and at least partly covers the corresponding side edge of the other frame half to provide an indication of the orientation of the transparency within the frame.

---

The present invention relates to a mounting frame for transparencies of the type consisting of two frame halves adapted to be joined to one another through friction means or other suitable securing means for example cooperating projecting parts and recesses provided on the surfaces of the halves facing each other.

When inserting such mounting frames in storage magazines or boxes, the frames must be orientated so that the film coating of the transparency or diapositive lies in a predetermined direction so that the mounted transparency, when inserted manually or automatically in a projecting apparatus, results in a correct picture in the vertical direction. Previous attempts to accomplish this orientation have had the two frame halves differently coloured, so that the film coating surface of the transparency is adequately positioned within the magazine when frame halves with one and the same colour are facing one end of the magazine. Positioning of the diapositive such that the projected picture is turned correctly can, however, not be done merely by means of differently coloured frame halves. To accomplish this orientation it has hitherto been necessary to use labels or other marking means, which are secured adjacent that edge of the frame to be positioned upwards in the magazine. Such labels have a tendency to flake off and the application of same is time consuming.

The object of the invention is to obtain a mounting frame, which does not require any separate marking means and nevertheless definitely indicates how to insert it in the storing magazine to ensure that the projected picture is correctly orientated.

The invention relates to a rectangular mounting frame for transparencies, consisting of two mounting frame halves, which are arranged to be joined together after positioning a transparency therebetween, characterized in that one side edge of at least one of the frame halves is provided with a flange perpendicular to the surface plane of the frame half, which flange, when the two frame halves are joined to a complete frame, extends over and at least partly covers the corresponding side edge of the other frame half.

By inserting each frame in the magazine with the flange directed for example upwards and the frame half provided with the flange facing a predetermined end wall of the magazine, a correctly orientated projected picture is always obtained and as conventionally the transparency is always positioned in a predetermined frame half and with the film coating on a predetermined side no extra checking is to be done to ensure correct orientation of the picture.

Other characteristic features will be evident from the following description and the drawing.

Figure 1:
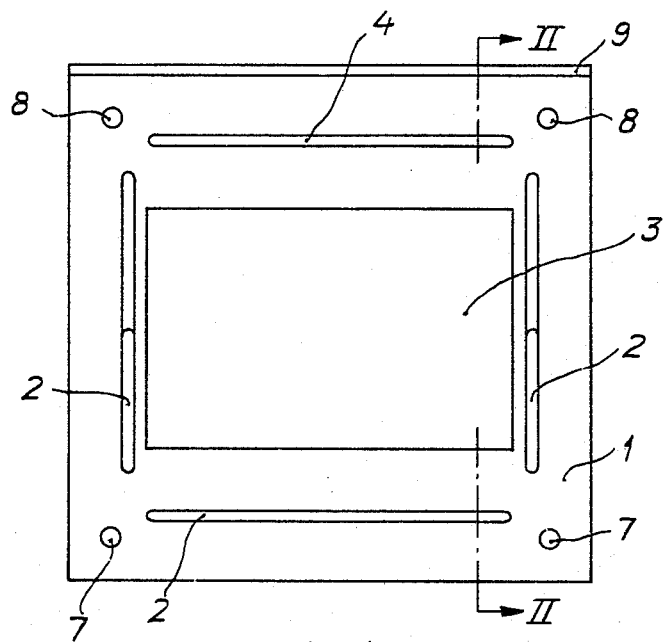
FIGURE 1 shows an embodiment of a frame half with a flange according to the invention.

According to the invention, frame half 1 is conventionally provided with ridges 2 between which the diapositive is positioned over the opening 3. The illustrated embodiment of the frame half 1 is further provided with a groove 4, cooperating with a ridge 5 on the complementary frame half 6, which may be identical with the frame half 1 and, thus, also provided with a flange. Frame half 1 is also provided with cylindrical projections 7 and cylindrical recesses 8 cooperating with corresponding recesses and projections, respectively, on frame half 6. This frame half 6 is provided with grooves corresponding to and receiving ridges 2. On pressing together the frame halves 1 and 6, the various ridges and grooves and recesses and projections cooperate so that a firm friction connection is established between the two halves.

It is obvious that the connecting means illustrated, which do not form any part of the invention, could be arranged in any desired manner.

Figure 3:
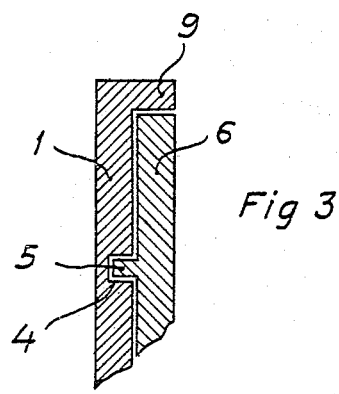
FIGURE 3 is a fragmentary view of a complete frame and illustrates particularly that the flange covers one edge of the other frame half.

The essential feature according to the invention is that at least frame half 1 is provided with a flange 9, which at least extends along part of one side edge of the rectangular frame half 1 and perpendicular to the plane of the frame half such that it will project over the corresponding side edge (FIG. 3) of the other frame half 6. In a preferred embodiment, shown on the drawing, the flange 9 has a length equal to the length of th side edge of frame half 1 and a free width corresponding to the thickness of frame half 6, whereby one side edge of said latter half will be completely covered by the flange. A definite marking, indicating how the mounted frame shall be inserted in a storage magazine, is, thus, obtained. Both frame halves could suitably be made of plastics and be of different colours, so that the correct insertion of the frame is further facilitated.

Figure 2:
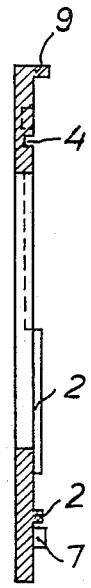
FIGURE 2 is a section taken along line II—II of FIG. 1.

As already mentioned, frame half 6 is preferably identical with frame half 1, so that the lower side edge of frame half 1 (FIG. 2) will be covered by the flange 9 of frame half 6. The frame halves may be bound together with an adhesive.

What I claim is:

1. A mounting frame for transparencies, comprising two frame members, cooperating means on each of the frame member for holding the frame members in assembled relation after positioning a transparency therebetween, each frame member having edge portions, one member having a flange along only one edge, the flange being perpendicular to the surface plane of the frame half and when the frame members are joined together to form the mounting frame, the flange extends over and covers the corresponding edge portion of the other member to indicate the orientation of the film with respect to the frame.

2. A mounting frame as in claim 1, where the flange extends along the full length of the one edge and has a width corresponding to the thickness of the other frame member.

References Cited

UNITED STATES PATENTS

| | | | |
|---|---|---|---|
| 2,837,854 | 6/1958 | Bing et al. | 40—152 |
| 3,200,527 | 8/1965 | Clark | 40—152 |
| 2,235,990 | 2/1966 | Back | 40—152 |

EUGENE R. CAPOZIO, Primary Examiner

W. J. CONTRERAS, Assistant Examiner